United States Patent [19]

Frantz

[11] Patent Number: 4,596,149
[45] Date of Patent: Jun. 24, 1986

[54] PRESSURE GAUGE ASSEMBLY
[75] Inventor: Virgil L. Frantz, Salem, Va.
[73] Assignee: Roanoke College, Salem, Va.
[21] Appl. No.: 756,588
[22] Filed: Jul. 19, 1985
[51] Int. Cl.[4] .......................... G01L 7/04; G01L 19/14
[52] U.S. Cl. ...................................... 73/756; 73/736;
73/431; 285/137.1
[58] Field of Search .................... 73/756, 431, 432 A,
73/736; 285/137.1, 137.2, 9.1, 9.2, 189

[56] References Cited

U.S. PATENT DOCUMENTS

| 2,475,468 | 7/1949 | Andrews | 285/137.1 |
| 3,557,602 | 1/1971 | Frantz | 73/756 |
| 3,603,154 | 9/1971 | Frantz | 73/756 |
| 4,507,707 | 3/1985 | Willis | 73/756 |

Primary Examiner—Donald O. Woodiel
Attorney, Agent, or Firm—Wilmer Mechlin

[57] ABSTRACT

A pressure gauge assembly for gauging and having an open-fronted casing connectable through check valving to one or more pressure lines, the valving being front-ported for receiving and normally held open by a plug inserted in each such port, the gauge of the assembly being so connected to the casing as to be removable therefrom only after removal of the one or more plugs and consequent closing of the check valving without either dismounting or uncoupling the casing from any pressure line.

6 Claims, 4 Drawing Figures

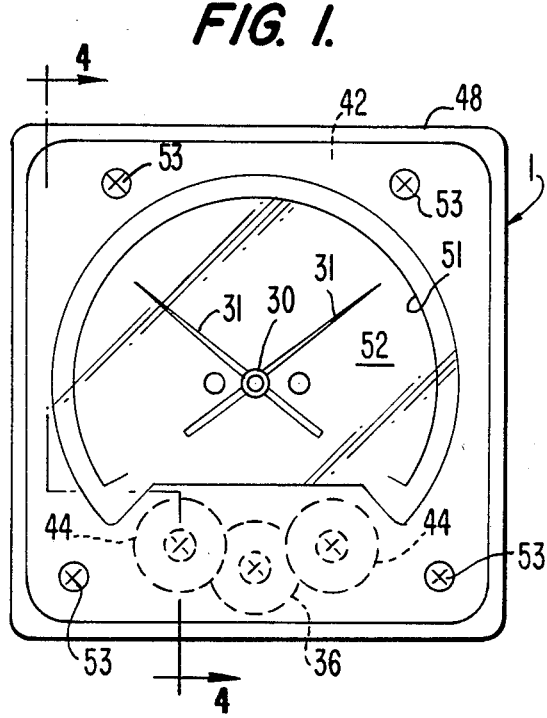
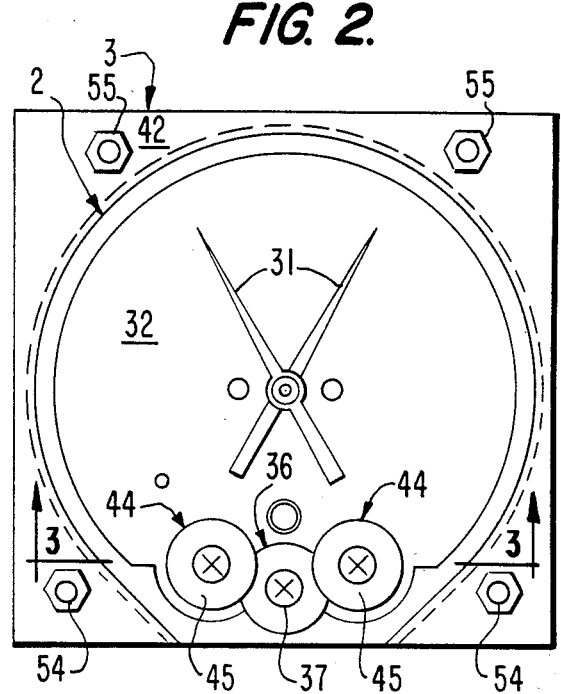
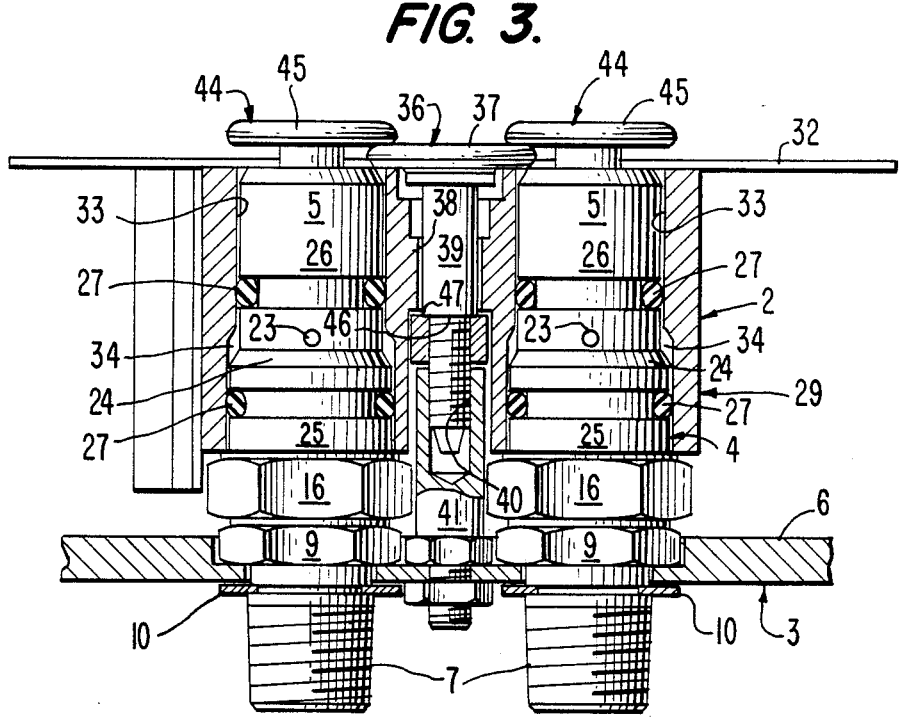

PRESSURE GAUGE ASSEMBLY

BACKGROUND OF THE INVENTION

Frantz U.S. Pat. No. 3,603,154 (Frantz '154) discloses a pressure gauge assembly for gauging one or more air pressure lines of a diesel locomotive, a gauge of which is both removable for repair or replacement and testable in situ by a gauge tester, such as disclosed in Frantz U.S. Pat. No. 3,557,602 (Frantz '602), without uncoupling the assembly from any connected pressure line. As explained in Frantz '154, pressure gauges previously had been testable in place but removable for repair or replacement only after they had been uncoupled from any pressure line to which they were connected. The gauge of Frantz '602 is removable without uncoupling pressure lines because releasably mountable on a mounting bracket permanently connectable to one or more pressure lines and containing in each connection a check valve automatically closable before either testing or removal of the gauge. The concern of the present invention is with a pressure gauge assembly having the capabilities of Frantz '154 and particularly adapted for use on rapid transit cars.

SUMMARY OF THE INVENTION

The primary object of the present invention is to provide an improved pressure gauge assembly having a casing containing a gauge and permanently connectable to one or more pressure lines through normally open check valving in the casing, the gauge being locked against removal from the casing except when relieved of line pressure by closing the valving.

Another object of the invention is to provide a pressure gauge assembly having an open-fronted casing containing a gauge and permanently couplable to one or more pressure lines, valving in the casing for each pressure line and slidably received in a base of the gauge for opening and closing the connection between the gauge and each pressure line without either dismounting the casing or uncoupling it from any pressure line, and a jack screw mounted for rotative and against axial movement in the gauge base and threadable into a socket in the casing for drawing the gauge into and out of the casing.

A further object of the invention is to provide an improved duplex pressure gauge assembly for simultaneously gauging a pair of pressure lines, wherein a casing containing a gauge is permanently connectable to the pressure lines and contains for each connection one of a pair of laterally spaced open-ended valve bodies each connectable at an inner end to a pressure line and closable at an outer end by a removable plug insertable therein, and a jack screw mounted for rotative and against axial movement in a base of the gauge and threadable into a fixed sleeve in the casing between the valve bodies for drawing the gauge into and out of the case.

An additional object of the invention is to provide a pressure gauge assembly for gauging one or more pressure lines, the assembly having a casing containing a gauge and for each pressure line an open-ended valve body connectable at the rear to a pressure line and normally closed at the front by a probe plug, a check valve in each valve body and normally held open by one of the plugs, the gauge for connection to a pressure line having a base apertured for slidably receiving a front portion of each valve body, and a jack screw mounted for rotative and against axial movement in the gauge base and threadedly received in a sleeve anchored to the casing for drawing the gauge into and out of the casing, the jack screw in gauge-locking position having a knob overlapped by a knob of each probe plug for preventing removal of the gauge from the casing except on removal of each probe plug.

The foregoing and other objects and advantages of of the invention will appear hereinafter in the detailed description, be particularly pointed out in the appended claims, and be illustrated in the accompanying drawings, in which:

FIGURE DESCRIPTION

FIG. 1 is a front elevational view of a preferred embodiment of the improved gauge assembly of the present invention;

FIG. 2 is a front elevational view on a larger scale of the assembly of FIG. 1 with the cover removed;

FIG. 3 is a fragmentary horizontal sectional view on an enlarged scale taken along lines 3—3 of FIG. 2.

DETAILED DESCRIPTION

Figure 4:
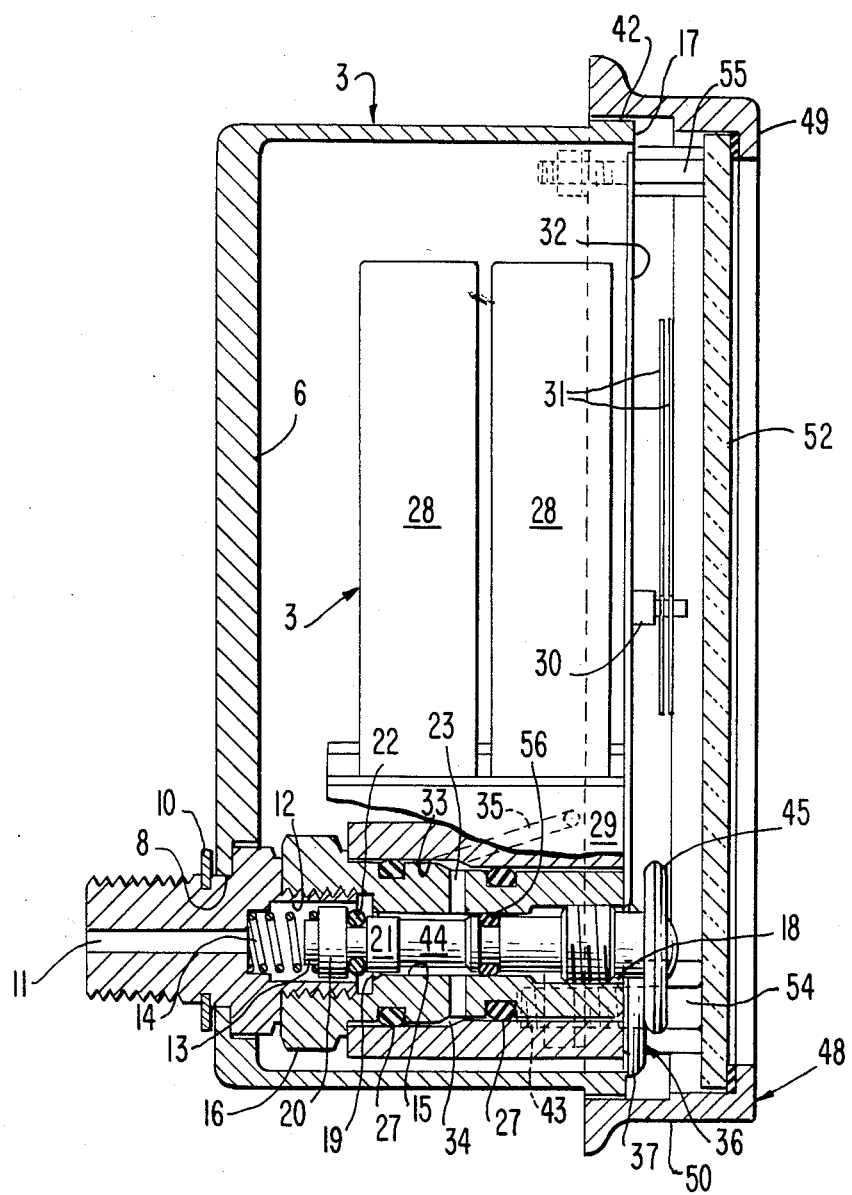
FIG. 4 is a vertical sectional view on the scale of FIG. 3 taken along lines 4—4 of FIG. 1.

Referring now in detail to the drawings in which like reference characters designate like parts, the improved pressure gauge assembly of the present invention, while adapted for guaging other pressure lines, is particularly designed for use in an instrument panel of a rapid transit car for gauging one or more, usually a pair of pressure lines.

Designated as 1, the improved gauge assembly is comprised of a gauge 2 and a case or casing 3, the latter conveniently mountable in an instrument panel (not shown) of a rapid transit vehicle or other structure (not shown), one or more pressure lines of which it is to gauge. Open-fronted, the casing 3 for connection to one or a pair or plurality of pressure lines (not shown), contains in its lower portion for each pressure line, check valving 4 including a valve body 5, which projects or extends forwardly normal to the casing's back or rear wall 6, the valve bodies, if a pair, being laterally spaced. The inner or rear end portion of each valve body 5, suitably in the form of an axially bored end or valve cap 7, seats in and extends through an opening 8 in the back 6 of the casing 3 and positions itself and the balance of the valve body by clamping the back inwardly by an integral annular boss 9 and outwardly by a snap ring 10.

The axial bore or passage 11 in each end cap 7, forwardly, leads or opens onto a concentric valve chamber 12 containing as a check valve an axially shiftable or reciprocable shuttle 13 urged or pressed forwardly by a return spring 14. The valve chamber 12 in turn opens forwardly onto the central or axial bore 15 in the main part 16 of the valve body 5, which part extends to the front end of the valve body and there terminates, substantially flush with the open front end 17 of the casing 3, in a front-opening probe port 18. Internally threaded over its front end portion but otherwise smooth-walled, the bore 15 opens rearwardly onto the valve chamber 12 in a forwardly tapered, rearwardly flaring frusto-conical valve seat 19. For closing the seat under force of the spring 14 when the latter is unopposed, the preferred shuttle has two axially spaced heads, a larger 20 contained in the valve chamber and a smaller 21 riding or sliding in and guided by the bore 15. For closing the valve seat 19, the shuttle carries between its heads 20 and 21 an O-ring 22 which on seating in the seat effectively seals off communication between the valve chamber and any pressure line connected to the end cap 7 and the bore 15.

The end cap 7 and main body part 16 together contain the valve chamber 12, access to which for insertion of the shuttle 13 and spring 14 conveniently is obtained by threading or screwing the front end of the end cap into the rear end of the main body part. Inwardly, the main body part 16 has the bore 15 interrupted forwardly of the valve seat 19 by a plurality of radial ports 23 opening outwardly in front of a forwardly tapering shoulder 24 demarking the juncture of the rear portion 25 and inwardly stepped or reduced outside diameter front portion 26, of the main body part and the portions are each peripherally grooved for seating O-rings 27 together bracketing or sandwiching the ports 23 and shoulder 24.

Illustrated as adapted simultaneously to gauge a pair of pressure lines, the assembly 1 has or contains in the casing 3 a pair of the check valvings 4, identical and laterally spaced and at their front ends substantially flush with the casing's front end 17. In keeping, the illustrated gauge 2 includes a pair of suitably Bourdon tube pressure sensitive or responsive members 28 mounted in tandem on a base 29 and each drivably connected to one of a pair of concentric shafts 30 each mounting at the front one of a pair of pointers 31 adapted to sweep independently over a dial 32 of the gauge in response to expansion and contraction of the associated or related Bourdon tube. Again, for the illustrated duplex gauge assembly, the base 29 has therein a pair of open-ended sockets or apertures 33 extending or disposed normal to the dial 32 and laterally spaced and internally configured in correspondence with respectively the spacing of the valvings 4 and externally forwardly stepped configuration of the main parts 16 of the valve bodies 5 in the casing 3. So spaced and configured, the base sockets 33, on insertion of the gauge 2 into the casing 3, are adapted to be slid onto or slideably receive the main parts 16 of the valve bodies 5 of the aligned valvings 4 and form with those parts an annular recess or passage bracketed and sealed off by the O-rings 27 and communicating through the radial ports 23 with the bore 15 of the main part forwardly of the valve seat 19. Separate drillings 35 in the base 29 operatively connect each of the pressure-sensitive members 28 to one of the annular recesses 34.

In the preferred assembly, insertion and removal of the gauge in and from the casing 3 is not a matter merely of sliding the gauge into and out of the casing. Instead, in the base 29 between and parallel to the sockets 33, there is mounted for relative rotative and against relative axial movement, a jack screw 36. With a circular knob or head 37 on its outer end, the jack screw 26 adjacent that end is smooth-stemmed for turning without axial movement in a bearing or bushing 38 integral with and inset in the base but inwardly of the bearing has its stem 39 threaded. In the assembled position of the gauge 2, the jack screw is axially aligned with and threadedly receivable or engageable in a forwardly opening threaded bore or aperture 40 of a sleeve 41 releasably anchored to or mounted on the casing's back 6 between and parallel to the illustrated pair of valve bodies 5. The jack screw 35 can be but, as illustrated, is not adapted to produce the full range of movement of the gauge 2 into and out of the casing 3, it usually sufficing for the screw to produce substantially the inner half of that range over which the frictional resistance of the O-rings 27 of the valve bodies 5 against the sides of the apertures 33 in the base 29 is the greater.

With a substantially rectangular radially outstanding peripheral mounting flange 42 at its front end and rearwardly thereof, generally of inverting pear-shape in cross-section, the casing 3 conveniently is mounted in an instrument panel (not shown) by a pair of mounting bolts 43 extending through lower corners of the flange and, when so mounted, has each check valving 4 coupled to a pressure line (not shown) by a pipe fitting or fittings (not shown) connecting the pressure line to the threaded outer end portion of one of the end caps 7. As in Frantz '154, the improved gauge assembly has screwed or threaded into each probe port 18 in the front end of each valve body 5, a probe plug 44 which is adapted to engage the front end of the shuttle 13 and, when fully inserted, displace or unseat the shuttle's O-ring 22 from the valve seat 19. The larger and smaller heads 20 and 21 of each shuttle 13 fitting loosely respectively in the valve chamber 12 and in the bore 15 in the valve body 5, when the shuttle is unseated, air or other fluid is free to pass around both heads to and through the radial ports 22. However, this open condition of a check valve 4 obtains only with the probe plug 44 in place and, absent the plug, the shuttle 13 is closed by the return spring 14, thus blocking flow of fluid from a pressure line through and beyond the valve seat 19. The gauge assembly 1 therefore is desirably coupled to any pressure line only with the related probe plug 44 removed.

The one or more probe plugs 44 also must be removed before insertion of the gauge 2 into the casing 3, since the overlap of the knob 45 of each plug with the knob 37 of the jack screw 36 otherwise would prevent the gauge from being inserted beyond the point of engagement of the knob of the jack screw with the knob 45 of each probe plug 44. With the plug or plugs 44 out and both shuttles 13 consequently closed, the insertion of the gauge 2 is completed by screwing the jack screw 36 into the sleeve 41. Rather than depend on engagement or contact of the front end of the sleeve 41 and a confronting shoulder 46 on the stem 39 of the jack screw 36 for limiting the range of inward movement of the gauge 2 in the casing 3, it is preferred that the knob 37 of the jack screw 36 be of a width to overlap the front ends of the valve bodies 5 in the casing. Contact or engagement of the jack screw knob 37 with the front ends of the valve bodies 5 thus is the preferred determinant of the limit on movement of the gauge 2 into operative or seated position in the casing 3. An elastomeric ring 47 on the stem 38 of jack screw between the shoulder 46 and sleeve 41 accommodates any further inward movement of the shoulder relative to the sleeve needed to establish contact between the jack screw knob and ends of the valve bodies 5.

In the operative or gauging condition or position of the gauge assembly 1, the probe plug or plugs 44 must be removed not only for insertion but also for removal of the gauge 2 from the casing 3. The jack screw 36, when threaded into the sleeve 41, does not move axially relative to the gauge but does so move relative to the casing 3. By contrast, the probe plugs 44 in place are axially stationary relative to the casing 3. Consequently, the overlap between the knobs 45 of the probe plugs 44 and 37 of the jack screw 36, so long as the probe plugs are in place, effectively locks the gauge 2 against removal from the casing 3. Also, since removal of the probe plugs 44 automatically closes the connection between the gauge 2 and any pressure line coupled to the casing 3, the gauge is removable without uncoupling the casing from any pressure line and over at least the inner part of its range of outward and inward movement is driven or moved by the jack screw 36.

For closing the otherwise open front end 17 of the casing 3, the gauge assembly 1 includes a cover 48 having a substantially rectangular frame 49, an inturned peripheral skirt or flange 50 of which slidably fits over the correspondingly rectangular mounting flange 42 of the casing. Suitably opaque, the frame 49 has a central opening 51 concentric and of an area to fully expose the dial 32 of the gauge 2, the opening 51 being covered interiorly by a conveniently circular lens clipped 52 or otherwise attached to the frame 49 and preferably made of transparent, substantially unbreakable or break resistant plastic. In place, the cover 48, while exposing the dial 32 and the pointers 31, desirably masks the base 29 of the gauge 3 and the suitably round-disk knobs 37 of the jack screw 36 and 45 of the probe plugs 44. Screws 53 in the four corners of the cover 48 attach it to the mounting flange 42 of the casing 3, the bottom pair threaded or screwed into internally threaded heads 54 of the mounting bolts 43 and the upper pair threaded through aligned spacers 55 on the mounting flange, which with the heads space the front of the cover from the mounting flange sufficiently to prevent interference with movement of the pointers 31 and contact with the knobs 37 and 45. To facilitate assembly and disassembly of the gauge assembly 1 with a minimum of tooling, save for the mounting bolts 43, spacers 55 and the pipe fittings (not shown) for fluid-connecting the casing 3 and therethrough the gauge 2 to one or more pressure lines, the corner screws 53, probe plugs 44 and jack screw 36 conveniently are all cross-slotted so as all to be actuatable by a Philips screwdriver.

Requiring only the probe plugs 44 for connecting and disconnecting the gauge 2 from any pressure lines coupled to the casing 3 without disturbing and therefore permitting the couplings to be permanent, removal of the cover 48 and probe plugs also enables the gauge to be tested by a gauge testing system, such as disclosed in Frantz '603. For such testing a hollow probe (not shown) of the type disclosed in that patent, is inserted in each of the probe ports 18 in place of the probe plugs. As opposed to the probe plugs, the test probes are too short when fully seated to unseat the shuttles 13 from the valve seats 19 but sufficiently long for fluid connection to the gauge through the radial ports 23. As are the probe plugs 44 by the O-rings 56, the test probes in place are suitably sealed against escape of fluid past them from the bore 15.

From the above detailed description it will be apparent that there has been provided an improved gauge assembly of which an open-fronted casing is permanently mountable in an instrument panel and couplable to one or more pressure lines, the gauge normally is fluid connected to each pressure line through check valving in the casing each suitably received in a socket in the base of the gauge and the fluid connection to the pressure line normally is opened and automatically closed respectively by insertion and removal of a probe plug, the gauge at least in part being inserted into and removed from the casing by a jack screw and the probe plug and jack screw are so relatively constructed and arranged as cooperatively to effectively prevent the gauge from being tested and removed from the casing without first removing the probe plugs. It should be understood that the disclosed embodiment is merely exemplary of the invention and that all modifications are intended to be included that do not depart from the spirit of the invention and the scope of the appended claims.

Having now described my invention, I claim:

1. A pressure gauge assembly comprising a casing member permanently couplable to pressure line means to be gauged, a gauge member in said casing member, interfitting means in said members for fluid connecting said gauge member to said pressure line means, and jack screw means for alternately securing said gauge member to said casing member and moving said gauge member inwardly and outwardly relative to said casing member.

2. A gauge assembly according to claim 1, wherein the casing member is open-fronted, the jack screw means is mounted for rotative and against axial movement in the gauge member and in operative position is threaded into fixed means in the casing member, and including valve means in the casing member in the fluid connection of the gauge member to the pressure line means, and means for opening and closing said valve means without uncoupling said casing member from said line means, said last named means cooperating with said jack screw means for preventing removal of said gauge member from said casing member except when said valve means are closed.

3. A gauge assembly for gauging one or more pressure lines, comprising open-ended valve body means mounted in said casing member and permanently couplable at a rear end to pressure line means, normally closed check valve means in said body means for opening and closing communication between bore means in said body means therebeyond and said pressure line means, plug means insertable in a front end of said body means for opening said valve means, a gauge member seatable in said casing member and including base means apertured for slidably and sealingly receiving said body means and pressure sensitive means mounted on said base means, means in said body and base means and communicating on seating of said gauge member in said casing member and opening of said valve means by said plug means for fluid connecting said pressure sensitive means to said pressure line means, and jack screw means mounted for rotative and against axial movement in said base means and threadable into fixed sleeve means in said casing member for at least in part driving said gauge member into and out of said casing member, said jack screw and plug means cooperating for preventing removal of said gauge member from said casing member except when said valve means is closed.

4. A gauge assembly according to claim 3 including knob means on said jack screw and laterally overlapped by knob means on said plug means for preventing removal of said gauge member from said casing member except after closing of said valve means on removal of said plug means.

5. A duplex gauge according to claim 4, wherein the valve body means are a pair of valve bodies each permanently couplable to a pressure line, the valve bodies are laterally spaced and slidably and sealingly receivable in correspondingly spaced apertures in a base of the gauge member, the jack screw is mounted in the base between said apertures, the plug means are a pair of plugs each seatable in a port in the front end of one of the valve bodies, and the overlapping knobs on the jack screw and plugs are flat disks.

6. A duplex gauge assembly according to claim 5, including a peripheral mounting flange at the front of the casing member, the pressure sensitive means of the gauge member are a pair of pressure sensitive tubes each drivably connected to one of a pair of concentric drive shafts each mounting a pointer independently sweepable on a dial, and including a cover peripherally flanged for slidably receiving said mounting flange of the casing member and centrally mounting a lens for observance of the positions of said pointers on said dial, said cover being attached to said mounting flange by screws each whereof and the disks are centrally cross-slotted for turning by a Philips screwdriver.

* * * * *